Figures 8, 9:
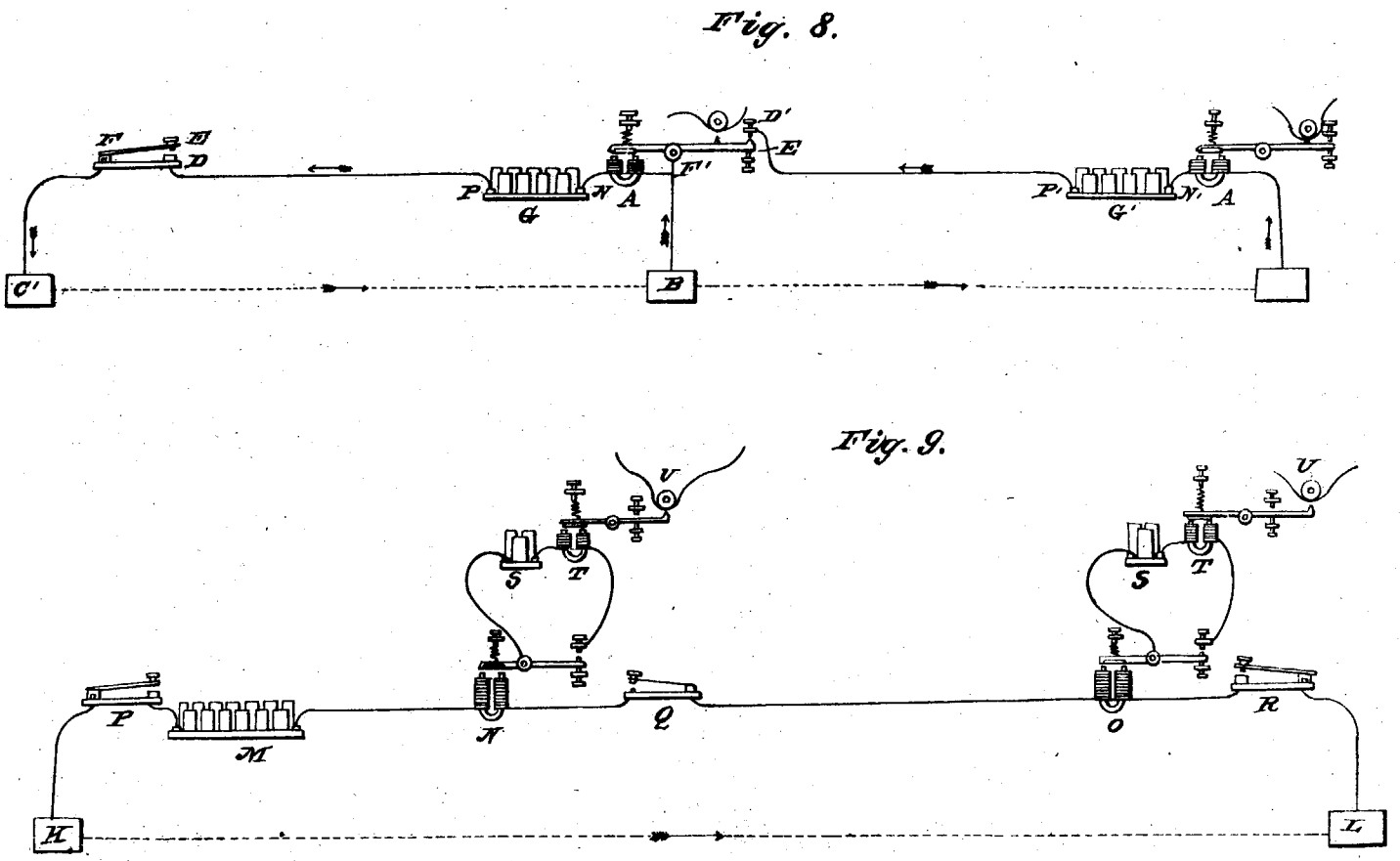

4 Sheets—Sheet 1.
S. F. B. MORSE.
Telegraph.
No. 118.
Reissued June 13, 1848.
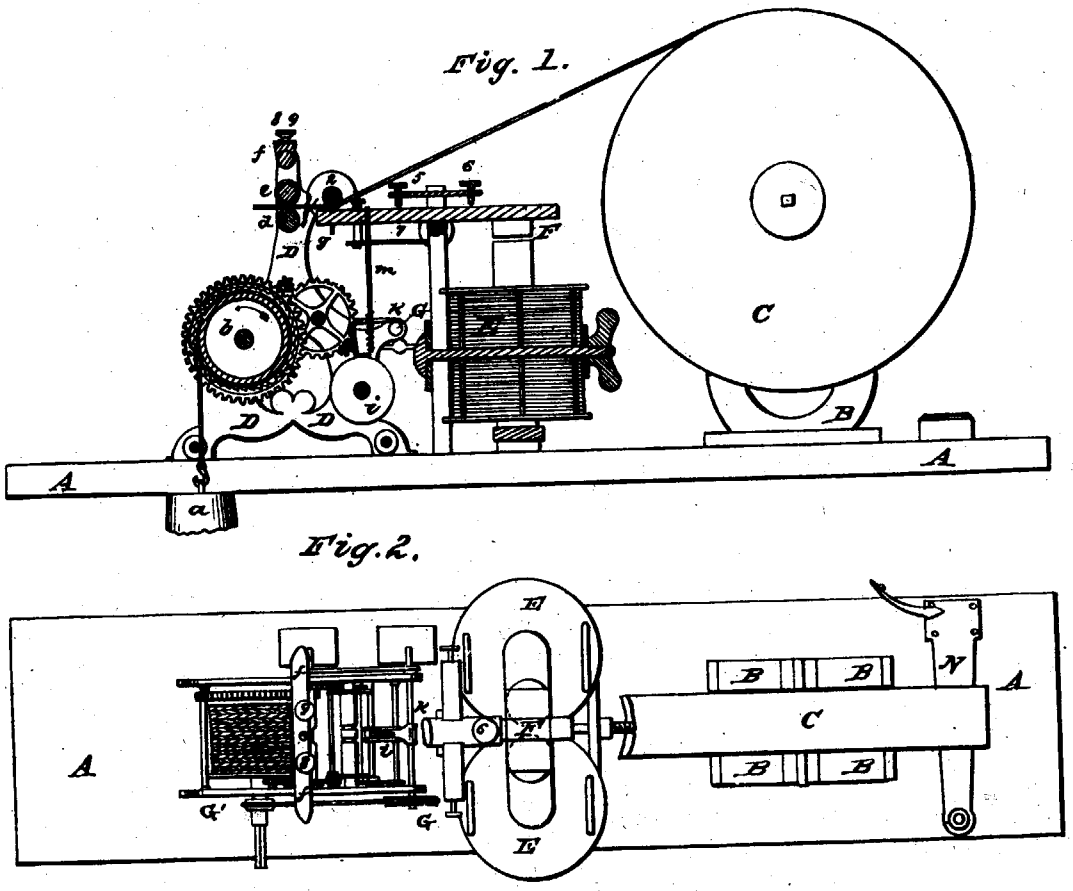

4 Sheets—Sheet 2.
S. F. B. MORSE.
Telegraph.
No. 118.
Reissued June 13, 1848.
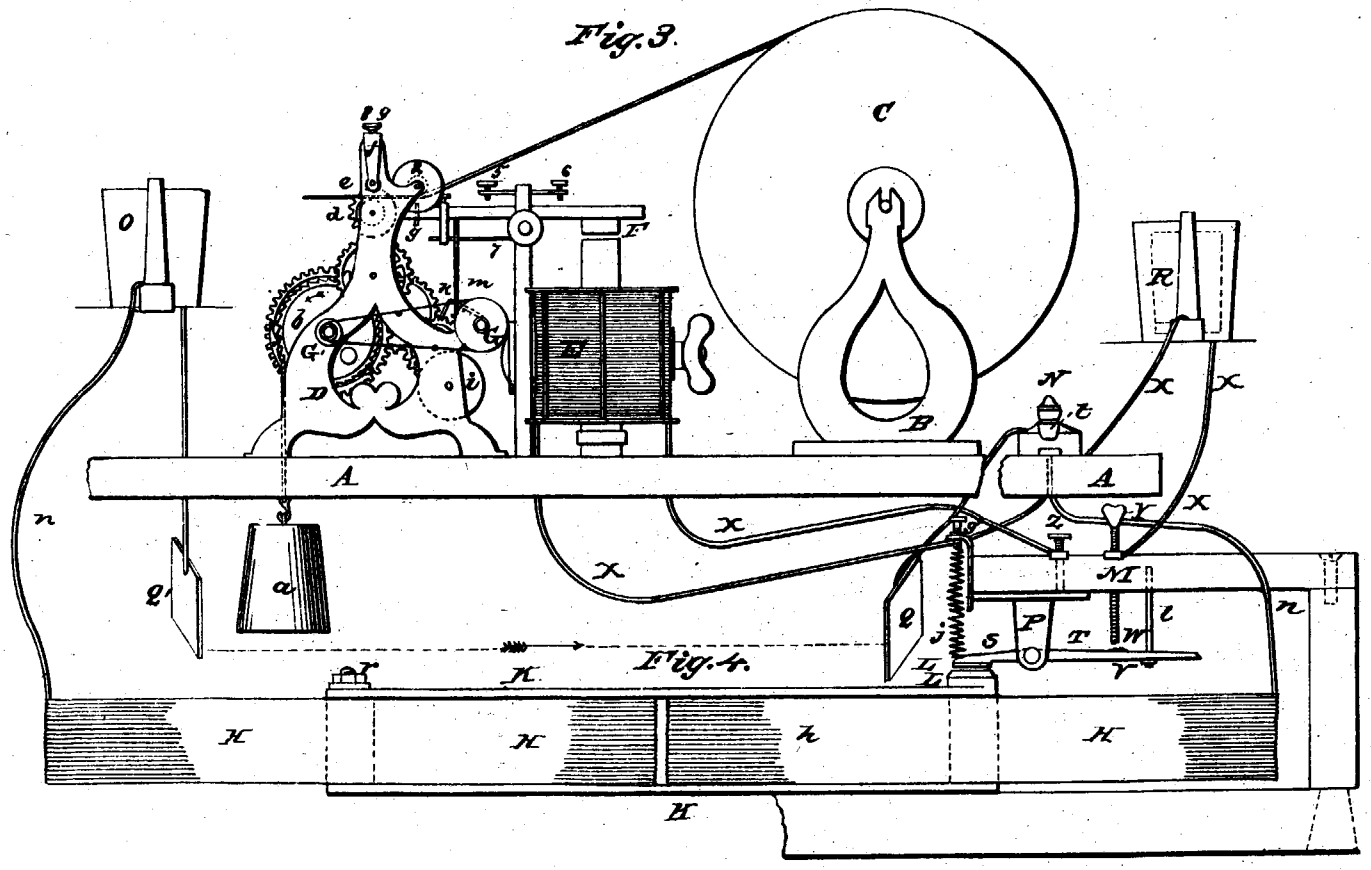

4 Sheets—Sheet 3.
S. F. B. MORSE.
Telegraph.
No. 118.
Reissued June 13, 1848.
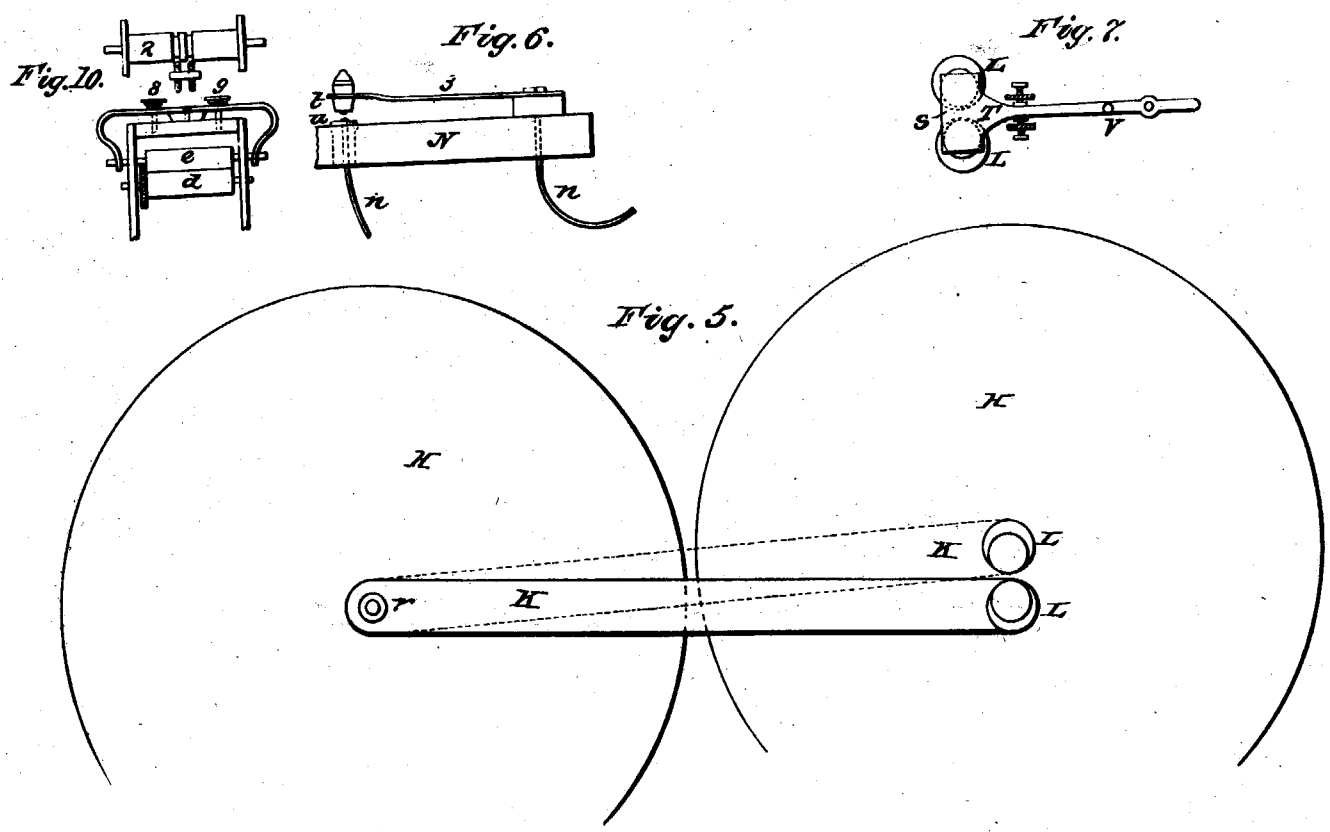

S. F. B. MORSE.

Telegraph.

No. 118.

Reissued June 13, 1848.

UNITED STATES PATENT OFFICE.

SAML. F. B. MORSE, OF POUGHKEEPSIE, NEW YORK.

IMPROVEMENT IN ELECTRO-MAGNETIC TELEGRAPHS.

Specification forming part of Letters Patent No. 4,453, dated April 11, 1846; Reissue No. 118, dated June 13, 1848.

*To all whom it may concern:*

Be it known that I, SAMUEL F. B. MORSE, now of Poughkeepsie, in Duchess county, in the State of New York, have invented a new and useful Improvement in the Electro-Magnetic Telegraphs; and I do hereby declare that the following is a full, clear, and exact description of the object, construction, and operation thereof, reference being had to the accompanying drawings, and making part of the same.

The original and final object of all telegraphing is the communication of intelligence at a distance by signs or signals.

Various modes of telegraphing or making signs or signals at a distance have for ages been in use. The signs employed heretofore have had one quality in common. They are evanescent, shown or heard a moment, and leaving no trace of their having existed. The various modes of these evanescent signs have been by beacon-fires of different characters, by flags, by balls, and reports of fire-arms, by bells heard from a distant position, by movable arms from posts, &c. I do not therefore claim to be the inventor of telegraphs generally. The electric telegraph is a more recent kind of telegraph proposed within the last century; but no practical plan was devised until about sixteen years ago. Its distinguishing feature is the employment of electricity to effect the same general result of communicating intelligence at a distance by signs or signals. The various modes of accomplishing this end by electricity have been the employment of common or machine electricity as early as 1787 to show an evanescent sign by the divergence of pith-balls; the employment of common or machine electricity in 1794 to show an evanescent sign by the electric spark; the employment of voltaic electricity in 1809 to show an evanescent sign by the evolution of gas-bubbles decomposed from a solution in a vessel of transparent glass; the employment of voltaic electricity in the production of temporary magnetism in 1820 to show an evanescent sign by deflecting a magnet or compass-needle. The result contemplated from all these electric telegraphs was the production of evanescent signs or signals only. I do not therefore claim to have first applied electricity to telegraphing for the purpose of showing evanescent signs or signals.

The original and final object of my telegraph is to imprint characters at any distance as signals for intelligence. Its object is to mark or impress them in a permanent manner. To attain this end I have applied electricity in two distinct ways: First, I have applied by a novel process the motive power of electro-magnetism, or magnetism produced by electricity, to operate machinery for printing signals at any distance; second, I have applied the chemical effects of electricity to print signals at any distance.

The apparatus or machine with which I mark or imprint signs or letters for telegraphic purposes at a distance I thus describe, viz.: first, the machinery at the transmitting terminus; second, the machinery at the receiving or recording terminus; third, the arrangement of circuits or conductors consisting of the main circuit and local circuit or circuits connecting the machinery of both termini.

First, the machinery at the transmitting terminus consists of the key or correspondent N. (See Sheet III, Fig. 6.) The part N is of wood or some convenient non-conducting substance. 3 is a spring or lever of metal, fastened upon N at one end and terminating at the other in a knob or hammer, *t*, faced with platinum. *u* is a metallic anvil, also faced with platinum. Parts of the electric conductor terminate at the key, the one part at the anvil *u* and the other at the hammer *t*, in such a way that the only part broken of the entire circuit is between the points *u* and *t*. The object of the key is to close and break the circuit.

Second, the machinery at the receiving terminus consists of the receiving-magnet. (See Fig. 4, Sheet II.) H H are the coils or helices of the magnet, being part of the main circuit of conductors. K K (see Figs. 4 and 5, Sheets II and III) represent the iron of the electro-magnet in a form to enable me to enlarge the coils or helices without separating to an inconvenient distance the poles L L from each other. K K represent the upper and lower portions of the magnet, which are without the coils, and one of which unites the two portions of the magnet within the coils, forming one piece with them. The other bar is united at one end to this piece by a screw at *r*, and runs divergent from the position of the other bar in such a manner as to bring the two poles L L near each other, but not in contact. This arrangement admits of coils of any desired size to form the helices of a magnet without requiring any increase in the size of the armature, thus allowing to the armature a quicker vibration and a more delicate adjustment. The special object of the receiving-magnet is to close and break at a distance another circuit, called a "local circuit," in which local circuit is a magnet and battery or their equivalents for the production of the power necessary to mark or imprint characters.

*s* is the armature of the receiving-magnet, affixed to the metallic lever T, supported by the metal standard P, which is attached to a wooden frame or other non-conducting substance, M. *j* is a spring so attached to the lever T as to withdraw the armature *s* from the poles L L of the magnet when the magnetic force is withdrawn, the other extremity of the spring being so attached to a thumb-screw, *q*, as to be adjusted to any desired degree of strength or delicacy. *l* is a stop (being a screw with a head) to regulate, in connection with another metallic screw, *y*, the limits of motion of the lever T. The screw *y* has its end, *w*, faced with platinum in order to form better contact with the platinum point or surface *v* on the lever T. On the proper adjustment of these two screws *l* and *y* depends the efficiency of the receiving-magnet. The limits of motion should be such that when the magnet is charged the point *v* should come in contact with the point *w*, but the surface of the armature should not touch the surface of the poles of the magnet, and when the magnet is not charged the armature should not be withdrawn by the spring *j* beyond the sphere of the magnet's attraction.

The register consists of a series of wheels and pinions, and its object is to regulate the movement of paper or other material upon which to imprint telegraphic characters.

A A, &c., Sheets I I I, Figs. 1 and 3, represent the platform, of wood or other convenient material, upon which is to be imprinted the telegraphic characters; D, one form of the arrangement of the wheels and pinions of the register; *d e*, rollers for drawing the paper in contact with the pen or marking-roller 2. (Seen also on Sheet III, Fig. 10.)

Sheet II, Fig. 3: E represents the helices or coils and magnet of the register; F, the pen-lever and armature of the magnet attached. 5 6 are stops, being thumb-screws attached to some convenient fixed part of the machinery, for limiting the motion of lever F, to which is affixed both the armature of the magnet E and the pen point or points *g*. The stop 5 arrests the movement of the armature as it moves toward and stop 6 as it recedes from (by the action of the spring 7) the poles of the magnet, according as magnetism exists or ceases. The spring 7 so operates on the lever F as to be antagonistic to the attractive power of the electro-magnet E—not so strong as successfully to resist the magnetic power when excited, but strong enough when the magnetic power ceases to bring the armature back quickly. The armature in its movements should not be allowed to touch the face of the magnet, nor should the point or points *g* (of which there may be one or more at pleasure) be allowed to touch the bottom of the groove or grooves of the roller 2. The pen point or points, if they are screws, aid in an exact adjustment of the pen-lever.

The frame D contains the train of wheels whose motion is caused by the weight *a* or its equivalent. Connected with this train of wheels is the self-stopping apparatus G G′, which consists of a friction-wheel or brake-wheel, *i i*, of any suitable material, as wood, cork, &c., which should be fixed upon any convenient part of the fly-wheel shaft, or the swiftest or one of the swiftest in the train. Another shaft, G, has at one extremity a pulley-wheel connected by a small cord with another pulley-wheel, G′, fixed upon the shaft of the barrel *b*. The diameter of the pulley-wheel G is greater than that of G′. Attached to and forming a part of the shaft of G is a small arm or brake, *k*, of metal or other suitable material, so formed as to come in contact with the friction-wheel *i i*. A light rod of wire, *m*, secured at one extremity to and dropped from the pen-lever F, has the other extremity with a screw-thread cut upon it, which rod passes freely through an opening in the brake *k*. A nut fitting the screw keeps the rod from passing back through the opening, and at the same time serves to adjust and regulate the movement of the brake. The object of the self-stopping apparatus is to enable the operator to put in action or to arrest at pleasure the movement of the distant register.

The paper-rollers *d*, *e*, and 2, Fig. 10, Sheet III, are so connected with the train of wheels that the paper drawn from the reels, by passing between *d* and *e*, is made to be in contact with the grooved cylinder 2. The roller *e* is kept in contact with *d* by the forked spring in Fig. 10 bearing upon the ends of the journals, and regulated in its strength by the thumb-screws 8 and 9. The bearing or sockets for the ends of the shafts of *e* are not circular, but are slots to allow of a slight movement in a direction with and against the force of the spring, so that the spring shall act with proper power tending to keep the cylinder *e* in contact with *d*.

*The circuits of conductors.*—A circuit is a continuous connection by a good conductor between and uniting the two poles of a battery or any generator of electricity. I use in my arrangement for imprinting signals two combinations of circuits in connection with the receiving-magnet or its equivalent:

The first combination consists of two or more single circuits consecutively arranged, each having a battery and receiving-magnet or their equivalents, the second circuit being dependent on the first circuit, and the third on the second, and the fourth on the third and so on *ad infinitum*, like links of a chain. In this combination of circuits the entire line is decombination of circuits the entire line is dependent on the entirety of each single circuit of the whole series.

The second combination consists of one main single circuit containing in it any number of receiving-magnets or their equivalents, the helices of which are successively and continuously connected. Each receiving-magnet or its equivalent closes and breaks an independent second circuit, which is no part of the main line, nor is the main line influenced in its action by the derangement of any one or all of the local or secondary circuits. Both combinations of circuits may be insulated upon posts, or otherwise, to any distances throughout a country These two combinations of circuits are illustrated by Figs. 8 and 9, Sheet IV.

*Example* 1.—The first link has a battery, G. From the pole P the circuit connects the anvil D of a key or correspondent where it terminates. From E it again commences, and, passing through F, continues to the plate C in the earth, thence through the earth to plate B, and then through the helices of the magnet A, terminating at the other pole, N, of the battery. At the key F E D is the only part of the circuit broken—to wit, between E and D. When E is pressed down so as to touch D the circuit is closed, and, the magnetic influence from the battery G operating on A, the lever F′ E′ D′ of the second link is brought down. D′ and E′ are connected, (the only broken parts of the second circuit similarly arranged as the first,) and the battery G′ operates the helices of the magnet A′, connected with another lever, and so on to a third link indefinitely.

*Example* 2, *Fig.* 9.—From one pole of the main battery M the conductor proceeds to the key P, where it is interrupted, (as in the key F E D of the previous example,) and thence proceeds to the plate K in the earth, passing through the earth to the plate L at the other terminus. From L it passes to a similar key, R, thence through the helices of receiving-magnet O to an intermediate key, Q, thence through the helices of receiving-magnet N, and so completeing the circuit at the other pole of the battery M. The local circuits are without the main line. When not in use the keys P, Q, and R are kept closed, so that wherever there is a key upon the line an operator can command the whole line by breaking and closing circuit with the key at his station. Each key operates every receiving-magnet on the line. N and O both operate when either of the keys P, Q, or R is made to close and break the circuit. When the main circuit is closed the magnetism at N and O operates the local lever or key which connects the local circuit, having the local battery S and the register-magnet T in the local circuit, causing the lever operated by T to mark the characters on the paper at U.

In the Example 1 the receiving-magnet propagates the magnetic impulse from circuit to circuit on consecutive and mutually-dependent circuits. In Example 2 it is propagated from a main circuit simultaneously to independent circuits.

*Connection of the other parts of the machinery with the circuits.*—O, Sheet II, Fig. 3, is the main battery, from one pole of which the main conductor *n* proceeds to the plate Q′ in the earth. From thence it passes in the direction of the arrow to the plate Q, thence to the key N, where it terminates at *t*. Commencing again at *u*, it proceeds to the helices of the magnet K K and back to the other pole of the battery O.

R is the local battery, from one pole of which the conductor X X X of the local circuit proceeds to the screw *y* and to the point *w*, where it terminates. Commencing at *v* on the lever T, it passes through the metal standard P to the screw *z*, from thence through the helices of the register-magnet E, and thence back to the other pole of the battery R.

Having thus described the object and construction of my invention, and the connection of the different parts of the machinery with each other, I will now describe the operation of the system combined as a whole.

The register D is at rest and the weight prevented from acting and moving the clock-work by the pressure or friction of the brake *k* upon the brake-wheel *i*, the brake being kept in contact with the brake-wheel by the power of the weight itself. Now, when the key or correspondent N is pressed down, so that the metallic hammer *t* shall strike the anvil *u*, this being the only part of the main circuit that is interrupted or broken, the circuit of conductors from the two poles of the main battery O are by this act connected, and the electricity from the battery freely passes through the entire circuit *n n n*, imparting magnetic power to the helices H H of the receiving-magnet K K. The armature S on the metallic lever T is now attracted by the poles L L and *v w*. The only part of the local circuit broken are brought together, closing the local circuit *x x x* of the local battery R, which instantly imparts magnetic power to the register-magnet E, to strike the point or pen *g* against the paper. The rising of the lever F has suddenly raised the brake *k*, by means of the rod *m*, from the brake-wheel *i*, so that now the weight *a* is permitted to move the whole train. The rollers *d e* commence drawing the paper in regular time from the paper-reel C. If the key which has been pressed down is now released and the circuit broken, the lever F falls, the power being gone that held it; but when it falls the lower end of the brake-rod, having free play through the opening in the brake-lever, does not, in its descent, take down the brake, but leaves it to the action of the clock-work gradually to bring it down into contact again with the brake-wheel. While closing and breaking the circuit, therefore, for imprinting the characters, the machine keeps in movement, for every rising of the lever F, in the act of writing or imprinting, prevents the brake-lever from descending and coming in contact with the brake-wheel, for the cord which connects G with G′ slips upon the smallest wheel G′, from the quickness of the action of the lever; but when the circuit remains broken for a short time, the lever F having fallen, there is now no more obstacle to the brake lever *k* in slowly descending by the action of the machinery till it comes in contact with the brake-wheel *i*, and thus arrests all motion.

In this manner, by the apparatus or machine or combination of machinery above described, I am enabled, standing at any one station, to mark or imprint signs or signals at any other station, however distant, and by a combination of these machines, by means of electro-magnetism, all being in order, I can at the same instant, by pressure upon one key, mark or imprint the same signs or signals at any number of points throughout the American continent. This machinery I call the "American electro-magnetic telegraph."

What I claim as my invention, and desire to secure by Letters Patent, is—

1. The employment, in a main telegraphic circuit, of a device or contrivance called the "receiving-magnet," in combination with a short local independent circuit or circuits, each having a register and register-magnet, or other magnetic contrivances for registering and sustaining such a relation to the register-magnet or other magnetic contrivances for registering, and to the length of circuit of telegraphic line, as will enable me to obtain, with the aid of a main galvanic battery and circuit and the intervention of a local battery and local circuit, such motion or power for registering as could not be obtained otherwise without the use of a much larger galvanic battery, if at all.

2. The combination of the apparatus called "the self-stopping apparatus," connected with the clock-work of the register, for setting said register in action and stopping it, with the pen-lever F, as herein described.

3. The combination of the point or points of the pen and pen-lever or its equivalent with the grooved roller or other equivalent device over which the paper or other material suitable for marking upon may be made to pass for the purpose of receiving the impression of the characters, by which means I am enabled to mark or print signs or signals upon paper or other fabric by indentation, thus dispensing with the use of coloring-matter for marking, as specified in my Letters Patent of January 15th, 1846.

SAML. F. B. MORSE.

Witnesses:
GEO. WOOD,
J. THOMAS CLARK.